June 14, 1927.
E. S. SHOWERS
1,632,384
STEERING MECHANISM FOR COASTER WAGONS
Filed April 29, 1926    2 Sheets-Sheet 1
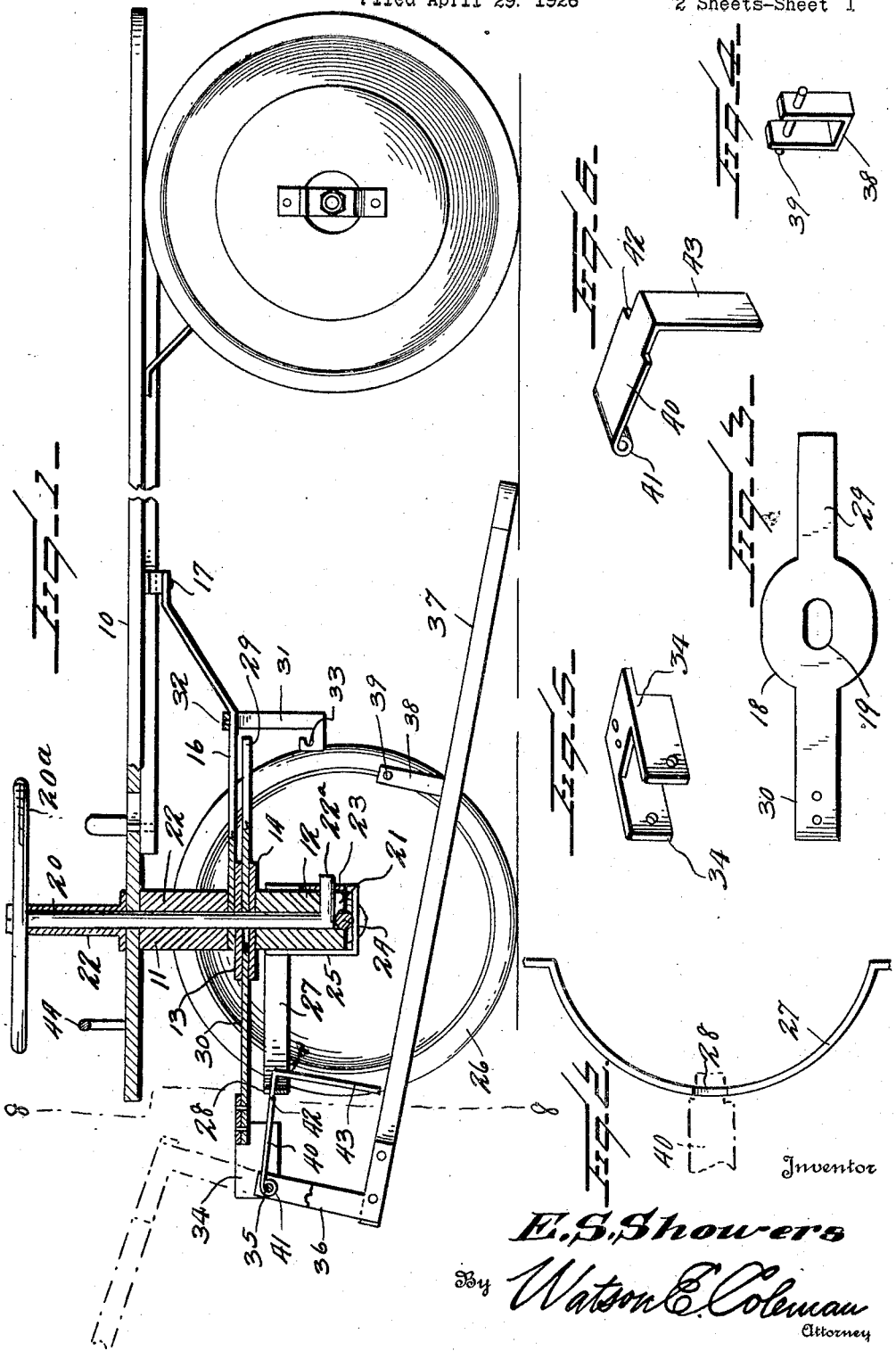
Inventor
E. S. Showers
By Watson E. Coleman
Attorney June 14, 1927.
E. S. SHOWERS
1,632,384
STEERING MECHANISM FOR COASTER WAGONS
Filed April 29, 1926    2 Sheets-Sheet 2
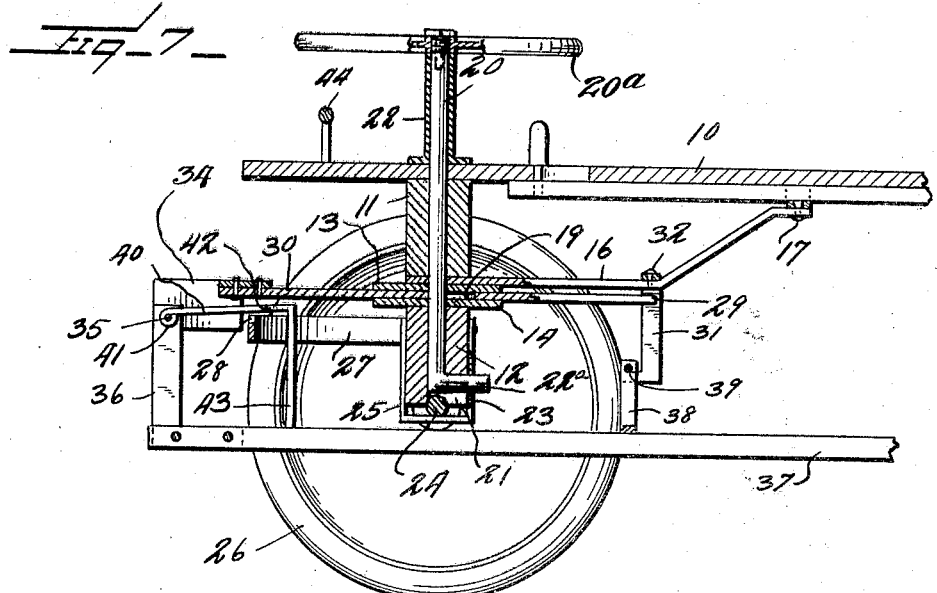
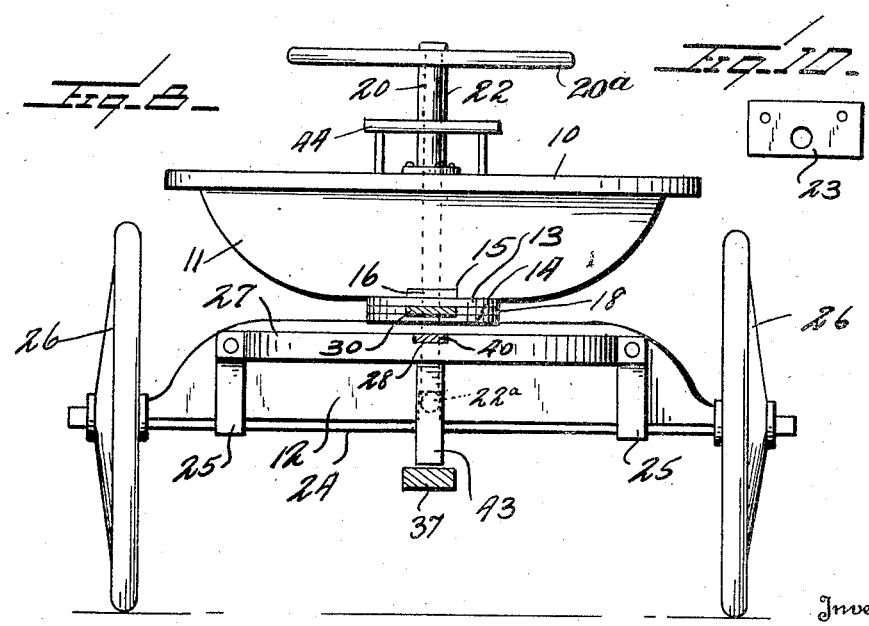
Inventor
E. S. Showers
By Watson E. Coleman
Attorney Patented June 14, 1927.

1,632,384

UNITED STATES PATENT OFFICE.

ERNEST SINCLAIR SHOWERS, OF CHAMPION, MICHIGAN.

STEERING MECHANISM FOR COASTER WAGONS.

Application filed April 29, 1926. Serial No. 105,568.

This invention relates to coaster wagons and particularly to the steering mechanism thereof, this steering mechanism being designed to be used in connection with the rear running gear and braking mechanism disclosed in my copending application filed April 29th, 1926, Serial No. 105,569.

The general object of the present invention is to provide a coaster wagon with a steering mechanism and a tongue, the parts being so constructed that the tongue may be used for drawing the wagon when desired and thereby steering it or causing it to properly trail, or that the tongue may be turned up beneath the platform or body of the wagon and the wagon steered by a steering wheel and post without affecting the tongue.

Other objects have to do with the details of construction and arrangements of parts whereby the tongue is held up beneath the body of the wagon and locked in this position when the steering wheel is being used without any danger of the tongue dropping down.

My invention is illustrated in the accompanying drawings wherein:—

Figure 1 is a side elevation of a wagon provided with my steering mechanism, the steering mechanism being in section;

Fig. 2 is a top plan view of the circle, showing the tongue in dotted lines;

Fig. 3 is a top plan view of the member 29;

Fig. 4 is a perspective view of the tongue support;

Fig. 5 is a perspective view of the hanger which pivotally supports the tongue;

Fig. 6 is a perspective view of the latch;

Fig. 7 is a longitudinal sectional view of the forward portion of the wagon showing the tongue raised;

Fig. 8 is a section on the line 8—8 of Figure 1;

Fig. 9 is a perspective view of the tongue supporting hook;

Fig. 10 is an elevation of the plate 23.

Referring to these drawings 10 designates the wagon platform which is supported at its rear end upon suitable running gear, as disclosed in my co-pending application, this running gear being provided with braking means. The front end of the platform 10 is supported by means of an upper bolster 11 and a lower bolster 12, the lower edge faces of these bolsters being rounded and there being circular plates or fifth wheel members 13 and 14 disposed between these bolsters 11 and 12.

The upper bolster 11 is recessed at 15 for the reception of a brace 16 which is apertured at its forward end for the passage of the steering post and then extends rearward in a horizontal plane and then upward and rearward and is engaged with the platform 10 in any suitable manner, as at 17. Disposed between the fifth wheels 13 and 14 is an oval plate 18 having a longitudinally extending slot 19 through which the steering post 20 passes, this steering post passing downward through the upper and lower bolsters, through the members 15, through the fifth wheels 13 and 14 and through the plate 18.

The lower bolster 12 is longitudinally recessed on its under face for the reception of the axle and is cut away at 21 at its middle. An iron pipe section 22 surrounds the steering post 20 and is supported on platform 10. The lower end of the steering post is angularly bent at 22ª and extends through a plate 23 attached to the rear face of the bolster 12. The axle 24 is held in engagement with the groove on the lower edge of the lower bolster by means of U-shaped clips 25, the legs of which are slotted for the passage of bolts whereby the clips may be raised or lowered to properly adjust the axle. The axle carries upon it the wheels 26 which are preferably metallic disk wheels. Preferably the steering wheel is held in place by a nut engaging the screw-threaded upper end of the steering post, the steering wheel being threaded to also engage said screw-threads.

Attached to the lower bolster 12 is a semicircular iron 27, the middle of which is recessed at 28 and the plate 18 has extensions 29 and 30 preferably formed integral with the plate and extending forward and rearward. The extension 29 extends parallel to the horizontal portion of the brace 16 and mounted upon this brace 16 is a supporting hook formed of a U-shaped clip 31 which is adapted to fit over the brace 16 and be attached thereto by a bolt 32. The legs of this U-shaped iron extend downward, then forward and upward and the upwardly extending portions are slightly undercut to thereby constitute two hooks 33, the bills of which are undercut.

Mounted upon the forward extension 30 of the plate 18 is a U-shaped support 34 having a transverse pin 35 disposed below the top of the clip, and pivoted on this pin 35 are the two approximately angular plates 36 which, at their upper ends, are bolted on each side of the tongue 37. This tongue midway between its ends has attached to it the U-shaped hanger 38 having a transverse pin or cross bar 39 which, when the tongue is shifted rearward, is adapted to engage over the hooks 33 and be supported thereby.

Pivotally mounted upon the pin 35 is an angular latch 40, the forward end of which is formed with a bead 41 engaging the pin 35. The rear portion of this latch is reduced in width so as to provide shoulders 42 disposed forward of the angular bend at the rear end of the latch. The angularly extending portion 43 of this latch extends downward behind the semi-circle 27 and the latch is adapted to extend through the recess 28, this recess having a width equal to the width of the portion of the latch rearward of the shoulders 42.

In the use of this device when it is desired that the wagon shall be steered by a steering wheel 20ª mounted upon the steering post 20, the forward end of the wagon is lifted by means of the handle 44 and the tongue turned inward beneath the platform 10. When in this position, the plate 18 with the extensions 29 and 30 is shifted rearward and this carries the rear end of the extension 29 into a lowered position between the laterally disposed legs of the member 31 and carries the angular latch 40 rearward and the pin 39 into engagement with the hooks 33 as before stated. Under these circumstances the plate 18 will be locked from any rotary movement, the tongue will be supported by the supporting means 41 and 38 and the wheels will be shifted for steering movement entirely by the post 20. When it is desired, however, to pull the wagon by means of the tongue, the wagon is again lifted and the tongue raised and pulled forward. This disengages the rear end of the extension 29 from between the legs of the member 31, thus permitting the plate 18 and the members 29 and 30 to oscillate and at the same time the latch is drawn forward by the drawing forward of the tongue so as to cause the narrow portion at the rear end of the latch to fit into the recess 28 in the semi-circular iron 27. Obviously, under these circumstances, the lateral swinging of the tongue will cause the rotation of the lower bolster and the shifting of the front wheels to cause the tongue to properly steer and trail.

The purpose of the shoulders 42 is to permit the wagon to be pushed rearward by means of the tongue, as upon a force being applied to the tongue to push it rearward, the shoulders 42 will engage against the front face of the circle 27 and thus the force will be transmitted to the wagon without causing the part 29 to enter between the legs of the member 31.

It will be seen that the running gear which I have devised permits the wagon to be used either purely as a coaster with the tongue locked beneath the wagon and entirely out of the way or permits the wagon to be pulled by means of the tongue. By reason of the fact that the pin 39 engages beneath the undercut portions of the hooks 33, it is obvious that the tongue will be positively held in its raised position beneath the wagon and in absolutely no danger of falling down which is particularly necessary where the wagon is being used for coasting.

While I have illustrated certain details of construction and arrangement of parts I do not wish to be limited thereto as many minor changes might be made without departing from the spirit of the invention as defined in the appended claims.

I claim:—

1. A coaster wagon having a body, a front axle and wheels thereon, a steering post operatively connected to the front axle, a tongue operatively pivoted to the front axle and adapted to be shifted from a pulling position to an inoperative position beneath the body, means permitting the tongue to be longitudinally shifted relative to the body in a rearward direction when the tongue is disposed beneath the body, means beneath the body for supporting the tongue when it is disposed beneath the body and shifted rearward, and means for latching the tongue against rearward shifting movement when the tongue is turned into its pulling position.

2. A coaster wagon having a body, a front axle, and wheels thereon, a steering post operatively connected to the front axle, a tongue operatively connected to the steering post for lateral swinging movement around the steering post, means operatively engaging the tongue with the front axle when the tongue is extended forward and in a pulling position, the front axle and the tongue thus having unitary swinging movement in a horizontal plane, said tongue having swinging movement in a vertical plane to a position beneath the wagon, means for automatically disconnecting the tongue from the front axle when the tongue is shifted into a position beneath the body, and means for supporting and locking the tongue in the last named position.

3. A coaster wagon having a body, a front axle and wheels thereon, a steering post operatively connected to the front axle, a tongue means operatively connecting the tongue to the front axle for lateral swinging movement therewith and operatively pivoting the tongue to the front axle for movement in a vertical plane from a pulling position to a position beneath the body, means automatically disconnecting the tongue from its first named operative engagement with the body when the tongue is shifted into a position beneath the body, and means extending downward from the body for supporting the tongue in its position beneath the body, said means locking the tongue against downward or swinging movement.

4. A coaster wagon having a body, an upper bolster and a lower bolster, an axle and wheels mounted upon the lower bolster, a steering post extending through the two bolsters and operatively engaged with the second named bolster and axle, the lower bolster having a half circle attached thereto, a brace engaging the upper bolster and the body and extending rearward from the upper bolster, a plate mounted upon the upper bolster concentric to the vertical axis thereof but shiftable rearward relative thereto and disposed in parallel relation to the half circle, said plate having a forward extension, a tongue pivoted to said forward extension for movement from a pulling position to a position beneath the wagon body and beneath the lower bolster, coacting means carried by said brace and tongue supporting the tongue when the latter is turned beneath the bolster and shifted rearward with said plate, said means acting to lock the plate from lateral movement when the plate is shifted rearward, and means latching the tongue and forward extension of the plate to the half circle for movement therewith when the tongue is turned into a pulling position but releasable from said half circle when the tongue is turned in position beneath the wagon body.

5. A coaster wagon having a platform constituting a body, an upper bolster, a lower bolster rotatable with relation to the upper bolster in a horizontal plane, an axle carried thereby, and wheels mounted on the axle, a half circle carried by the lower bolster and notched at its middle, a steering post extending downward through the upper and lower bolsters and constituting an axis therefor, and operatively connected with the lower bolster for turning movement, a plate mounted between the upper and lower bolsters and longitudinally slotted for the passage of the steering post, said plate having a forward extension and a rearward extension, a depending member operatively supported from the platform and having legs between which the rearward extension may engage when the plate is shifted rearward and having at its lower end upwardly extending hooks, a tongue having an angular member at its forward end operatively pivoted to the forward extension and movable in a vertical plane from a pulling position to a position beneath the lower bolster, said tongue carrying a hanger adapted to engage with said hooks when the plate is shifted rearward and the tongue disposed below the lower bolster, and a latch mounted in connection with the angular portion of the tongue and the forward extension of said plate adapted to engage in the notch in the half circle and when so engaged prevent the rearward movement of the tongue and of the plate to which it is attached or to be disengaged from the half circle to permit the rearward movement of the tongue and plate.

6. A coaster wagon having a platform constituting a body, an upper bolster, a lower bolster rotatable with relation to the upper bolster in a horizontal plane, an axle carried thereby, and wheels mounted on the axle, a half circle carried by the lower bolster and notched at its middle, a steering post extending downward through the upper and lower bolsters and constituting an axis therefor, and operatively connected with the lower bolster for turning movement, a plate mounted between the upper and lower bolsters and longitudinally slotted for the passage of the steering post, said plate having a forward extension and a rearward extension, a depending member operatively supported from the platform and having legs between which the rearward extension may engage when the plate is shifted rearward and having at its lower end upwardly extending hooks, a tongue having an angular member at its forward end operatively pivoted to the forward extension and movable in a vertical plane from a pulling position to a position beneath the lower bolster, said tongue carrying a hanger adapted to engage with said hooks when the plate is shifted rearward and the tongue disposed below the lower bolster, and a latch pivotally engaged with the angular portion of the tongue, the latch being reduced in width at its rear end to fit within the notch in the half circle and being angularly bent downward at its rear end, the reduction in the width of the latch forming shoulders bearing against the half circle when the latch is engaged with the notch thereof, the rotation of the tongue into engagement with said supporting hooks acting to cause the tongue to engage the downward extension of the latch and thereby automatically lift the latch out of engagement with the half circle.

In testimony whereof I hereunto affix my signature.

ERNEST SINCLAIR SHOWERS.